United States Patent

[11] 3,552,426

| [72] | Inventors | Clarence H. Hester;<br>Frank G. Weeden, Houston, Tex. |
|------|-----------|---|
| [21] | Appl. No. | 840,794 |
| [22] | Filed | July 10, 1969 |
| [45] | Patented | Jan. 5, 1971 |
| [73] | Assignee | John L. Dore Co.<br>Houston, Tex.<br>a corporation of Texas |

[54] VACUUM BREAKER DEVICE
7 Claims, 1 Drawing Fig.

| [52] | U.S. Cl. | 137/375,<br>137/543.13 |
|------|----------|---|
| [51] | Int. Cl. | F16k 27/12,<br>F16k 15/02 |
| [50] | Field of Search | 137/375,<br>540, 541, 543, 543.21, 543.17; 251/333, 334, 368 |

[56] References Cited
UNITED STATES PATENTS

| 2,608,210 | 8/1952 | St. Clair | 137/543X |
| 2,784,737 | 3/1957 | Kelly | 137/543.17X |
| 3,192,946 | 7/1965 | Wiersholm | 137/375 |
| 3,334,650 | 8/1967 | Lowrey et al. | 137/375 |

*Primary Examiner*—Henry T. Klinksiek
*Attorneys*—James F. Weiler, Jefferson D. Giller, William A. Stout, Paul L. DeVerter, II, Dudley R. Dobie, Jr. and Henry W. Hope ABSTRACT: A vacuum breaker device for preventing excessive buildup of vacuum within a piping system or vessel containing corrosive fluid. The device includes a body member having a liner secured within an axial bore in the body member, the liner having an annular raised seat to receive a lined valve member that is yieldably biased against such raised seat.

PATENTED JAN 5 1971
3,552,426
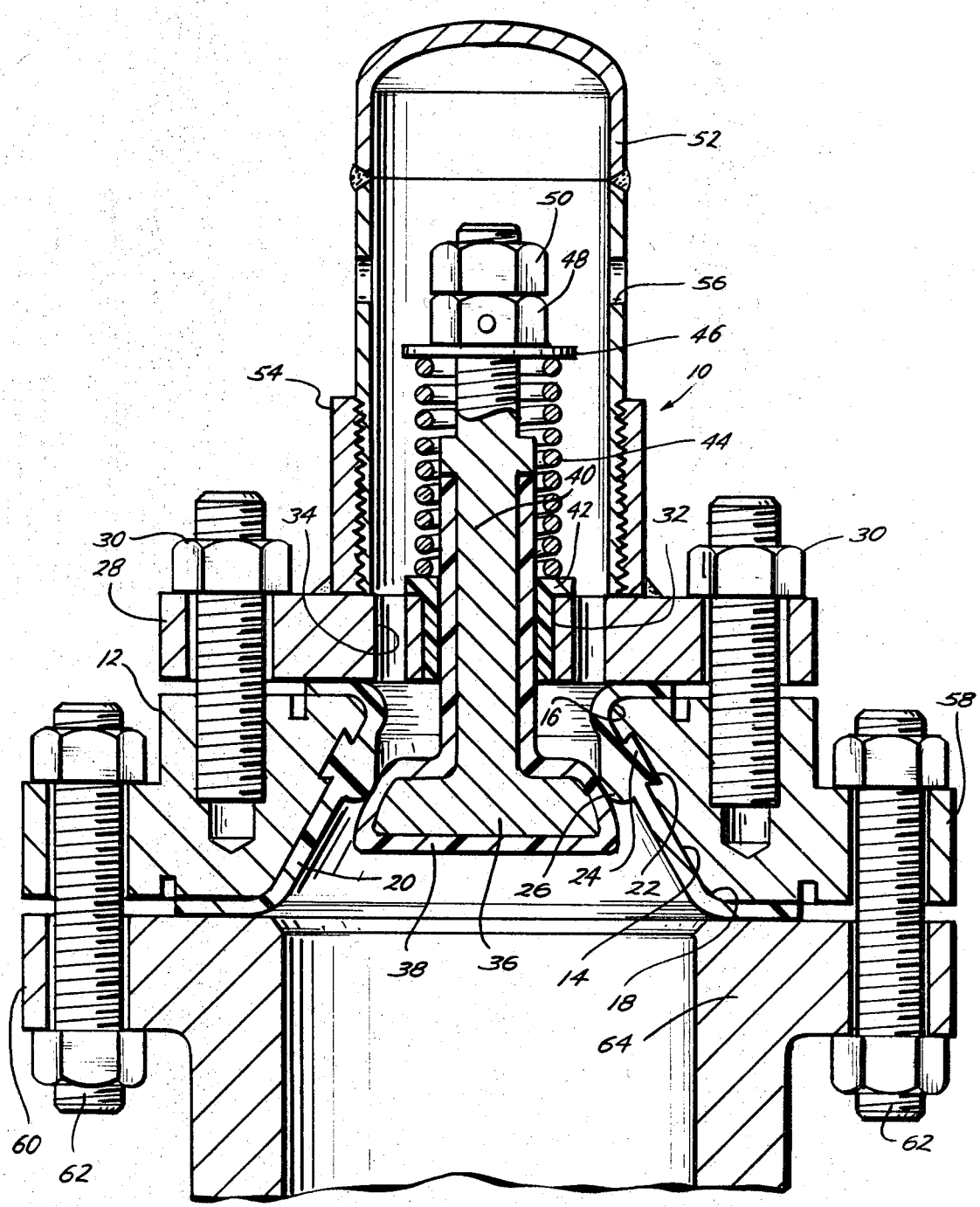
Clarence H. Hester
Frank G. Weeden
INVENTOR.
BY James F. Weiler
William A. Stout
Paul L. DeVerter II
Dudley R. Dobie, Jr.
ATTORNEY

VACUUM BREAKER DEVICE

BACKGROUND OF THE INVENTION

Piping systems or vessels operating under vacuum conditions and containing corrosive fluids are potentially hazardous should excessive vacuum develop therein and cause a rupture within the system. Likewise, if the piping system or vessel is lined with a corrosion resistant liner, an excessive vacuum therein can cause collapse of the liner similarly leading to a malfunction.

It would be highly advantageous to provide means for releasing excessive vacuum wherein such means is likewise resistant to corrosion, is operatively reliable and is relatively simple in construction. The present invention is directed to such means.

SUMMARY OF THE INVENTION

The present invention provides a vacuum breaker device that is adaptable and/or adjustable to release virtually any level of vacuum within a piping system or vessel. The device includes a body portion and valve member both of which are lined with corrosion resistant plastic material so that corrosive fluids within the piping system or vessel being regulated will not attack the functional parts of the device which otherwise would render the device inoperable. The valve member is yieldably biased against an annular seat formed of the liner secured to the body portion so that the valve device remains closed until the piping system or vessel experiences a predetermined vacuum level whereupon the device of the invention opens. The vacuum breaker device will remain open until the vacuum decreases to a point below the predetermined lever (i.e., remains open until the absolute pressure within the piping system or vessel increases to a predetermined level).

It is, therefore, an object of the present invention to provide a vacuum breaker device for coaction with a piping system or vessel whereby, upon buildup of vacuum to a predetermined level, the device of the invention will open to release the vacuum so as to prevent implosion or collapse of the piping system or vessel.

A further object of the present invention is the provision of such a vacuum breaker device having a lined body member and a lined valve seatable against a raised seat formed of the liner of the body member and having spring means yieldably biasing the valve into a closed position but openable on being subjected to a predetermined level of vacuum.

Yet a further object of the present invention is the provision of a vacuum breaker device having a body member, a plastic liner disposed within an axial bore within the body member, a valve member seatable against a seat formed of the body member liner, a plate member for guiding the stem of the valve member and spring means for yieldably biasing the valve against the annular seat of the body member liner.

Other and further objects, features and advantages will be apparent from the following description of a presently preferred embodiment of the invention given for the purpose of disclosure and taken in conjunction with the accompanying drawing.

DESCRIPTION OF THE DRAWING

The drawing is a cross-sectional elevational view of the vacuum breaker device of the present invention shown secured to a flange of a piping system.

DESCRIPTION OF THE PREFERRED EMBODIMENT

With reference to the drawing, the vacuum breaker device of the present invention as represented generally by the reference numeral 10 includes a body member 12 that is preferably of an annular or ringlike configuration as shown. The body member 12 is provided with an axial bore 14 that tapers from a smaller diameter 16 to a larger diameter 18. A plastic liner 20 is disposed concentrically within the axial bore 14 and flares outwardly at both ends of the bore as shown in the drawing.

The plastic liner 20 is formed of a suitable corrosion resistant resin, the particular resin being used, of course, depending upon the corrosive character of the fluid or substance to be protected against. For example, fluorocarbon resins such as Teflon (polymerized tetrafluoroethylene), Fluorothene (polychlorotrifluoroethylene), Kel-F (polymerized trifluorochloroethylene), fluorinated ethylenepropylene, and other resins such as polypropylene and the like may be used. As shown in the drawing, a female holding means such as a mortise 22 is formed in the wall of the axial bore 14 of the body member and male holding means such as a tenon 24 is formed on the external surface of the liner 20 opposite the female holding means or mortise 22. The male holding means or tenon 24 and the female holding means or mortise 22 are in interlocking engagement whereby the liner 20 is secured to the wall of the axial bore 14 against axial as well as radial displacement. In addition, integrally formed of the liner 20 on the internal surface thereof is an annular raised seat 26.

A plate member 28 is secured to the body member preferably such as by means of a plurality of bolts 30 adjacent the smaller diameter end 16 of the axial bore 14. The plate 28 itself has a bore 32 aligned axially with the bore 14 of the body member. Also provided in the plate member 28 is at least one and preferably a plurality of holes 34 forming a passageway(s) providing communication between the bore 14 of the body member and the exterior side of the plate 28, i.e., the side of the plate opposed from the body member. It will be noted that the plate 28, in being boltably secured to the body member, compressingly engages the end of the plastic liner 20 at the smaller diameter end 16 of the bore 14 such that the end of the liner is firmly held between the body member 12 and the plate member 28.

A valve member 36 is also lined with plastic material forming an exterior liner 38, the lined valve member 36 being seatable against the annular raised seat 26 of the liner 20. A stem 40 integrally formed or otherwise secured to the valve 36 slidably extends through the bore 32 of the plate member 28. Preferably, the valve stem 40 is also lined such as by continuation of the liner 38, and a bushing 42 formed of similar liner material is secured between the stem 40 of the valve member and the axial bore 32 of the plate member. Advantageously, forming the bushing 42 of Teflon promotes slidability of the valve 36 within the bore 32 as well as providing resistance to corrosion.

The valve 36 is yieldably biased against the annular raised seat 26 by means of a compression spring 44 abutting the bushing 42 at one end and being retained by a spring follower 46 at the other end. The follower 46 is held in position by means of a nut 48 threadably engaging the stem 40, the nut 48 being locked by a lock nut 50.

It is preferred that a cap 52 be provided to form a protective enclosure about the spring and valve stem and to hinder tampering with the setting of the nut 48 and lock nut 50. The cap 52 may be secured such as by threadable engagement with a boss member 54 secured as by welding to the plate member 28. The cap 52 is provided with at least one vent hole 56 to provide communication from within the cap to the exterior.

In operation, the body member 12 preferably is provided with a radially projecting flange 58 that is attachable, for example, to a corresponding flange 60 of a pipe or vessel by means of a plurality of bolts 62. By such flange means, the end of the plastic liner 20 at the larger diameter end 18 of the axial bore 14 of the body member may be compressingly engaged between the body member and the pipe or vessel 64 to which the device 10 is secured. Thus the liner member 20 is held firmly against the body member 12 at both ends as well as intermediate the ends by means of the male and female holding means described previously. A compression spring 44 is selected as will be appreciated by those skilled in the art such that tension on the spring may be adjusted by the nut 48 and locked by means of the nut 50 so that the valve 36 will remain seated against the seat 26 until vacuum within the pipe or vessel 64 builds to a predetermined negative pressure. When the vacuum reaches such a predetermined negative pressure, tension of the spring 44 is overcome by virtue of the vacuum acting to pull the valve 36 away from the seat 26 whereby air or the atmosphere present about the cap 52 may flow through the vent hole 56 and then through the hole or passageway 34 in the plate member 28 and between the valve 36 and the raised seat 26 into the pipe or vessel 64. Thus the vacuum in the pipe or vessel 64 is broken and implosion or collapse thereof prevented. The valve 36 will reseat against the seat 26 by virtue of tension of the spring 44 only when absolute pressure within the pipe or vessel 64 increases to overcome the force of the spring 44.

While the drawing does not show a liner disposed within the pipe or vessel 64, it will now be recognized that the vacuum breaker device of the present invention is uniquely suited to regulate vacuum within such lined pipe or vessel to prevent liner collapse which is often a potential problem in any lined system handling relatively corrosive substances. As will be recognized, however, the device of the present invention is also useful in unlined systems handling corrosive substances, proper functioning of the valve being assured by virtue of the liner members 20 and 38 as well as the bushing member 42 as has been described.

The present invention, therefore, is well adapted to carry out the objects and attain the ends and advantages mentioned as well as others inherent therein.

We claim:

1. A vacuum breaker device comprising:
   a. a body member having an axial bore tapering from a smaller to a larger diameter;
   b. a corrosion resistant plastic liner concentrically disposed within said axial bore and flared outwardly at the ends of the bore;
   c. an annular raised seat formed on the internal surface of the liner (b) intermediate the ends thereof;
   d. female holding means formed in the wall of the axial bore of the body member (a);
   e. male holding means formed on the external surface of the liner (b) opposite the female holding means, said male holding means and said female holding means being in interlocking engagement whereby said liner (b) is secured to the wall of the axial bore against axial and radial displacement therefrom;
   f. a plate member secured to the body member (a) adjacent the smaller diameter end of the axial bore therethrough, said plate having a bore axially aligned with said body member bore and having a passageway providing communication between the body member bore and the side of the plate opposed from the body member bore;
   g. a valve member seatable against the annular raised seat (c) and having a stem slidably extending through the axial bore of the plate member (f), said valve member being lined exteriorly with a plastic liner; and
   h. spring and follower means coacting with the stem of the valve member (g) yieldably biasing the valve against the annular raised seat (c).

2. The vacuum breaker device of claim 1 wherein the body member (a) includes a radially projecting flange secured thereto and adapted to be attached to a pipe or vessel flange such that the end of the plastic liner (b) at the larger diameter end of the axial bore of the body member (a) may be compressingly engaged between the body member and said pipe or vessel flange.

3. The vacuum breaker device of claim 1 wherein the plate member (f) is secured to the body member (a) such that the end of the plastic liner (b) at the smaller diameter end of the axial bore of the body member is compressingly engaged between the body member and said plate member.

4. The vacuum breaker device of claim 1 including additionally, a plastic bushing secured between the stem of the valve member (g) and the axial bore of the plate member (f).

5. A vacuum breaker device comprising:
   a. a body member having an axial bore tapering from a smaller to a larger diameter, the body member further having a radially projecting flange secured thereto and adapted to be attached to a pipe or vessel;
   b. a corrosion resistant plastic liner concentrically disposed within said axial bore and flared outwardly at the ends of the bore such that the end of the plastic liner at the larger diameter end of the axial bore of the body member (a) may be compressingly engaged between the body member and said pipe or vessel flange;
   c. an annular raised seat integrally formed on the internal surface of the liner intermediate the ends thereof;
   d. female holding means formed in the wall of the axial bore;
   e. male holding means formed on the external surface of the liner opposite the female holding means, said male holding means and said female holding means being in interlocking engagement whereby said liner is secured to the wall of the axial bore against axial and radial displacement therefrom;
   f. a plate member secured to the body member adjacent the smaller diameter end of the axial bore therethrough, said plate having a bore axially aligned with the bore of the body member (a), and having a passageway providing communication between the body member bore and the side of the plate opposed from the body member. said plate member being secured to the body member (a) such that the end of the plastic liner (b) at the smaller diameter end of the axial bore of the body member is compressingly engaged between the body member and said plate member;
   g. valve member seatable against the annular raised seat (c) and having a stem slidably extending through the axial bore of the plate member (f), said valve member being lined exteriorly with a plastic liner; and
   h. spring and follower means coacting with the stem of the valve member (g) yieldably biasing the valve against the annular raised seat (c).

6. The vacuum breaker device of claim 5 including additionally, a plastic bushing secured between the stem of the valve member (g) and the axial bore of the plate member (f).

7. The vacuum breaker device of claim 5 including additionally, a cap secured to the plate member (f) and enclosing the valve stem (g) and spring and follower means (h), said cap having at least one vent hole therein.